United States Patent [19]

Honda et al.

[11] Patent Number: 5,070,298
[45] Date of Patent: Dec. 3, 1991

[54] MAGNETIC SENSOR, WITH SENSOR GAP ADJUSTING HIGH PERMEABLE FLUX COLLECTING CHIP, FOR DETECTING ROTATION

[75] Inventors: Naoko Honda; Tatsuo Nakajima, both of Higashimatsuyama, Japan

[73] Assignee: Diesel Kiki Co., Ltd., Tokyo, Japan

[21] Appl. No.: 508,176

[22] Filed: Apr. 12, 1990

[30] Foreign Application Priority Data

Apr. 19, 1989 [JP] Japan .................. 1-97619

[51] Int. Cl.⁵ .............. G01P 3/487; G01P 3/488; G01B 7/30
[52] U.S. Cl. ................... 324/207.20; 324/174; 324/207.25
[58] Field of Search ............ 324/173, 174, 207.2, 324/207.21, 235, 251, 252; 310/DIG. 3; 323/368; 123/617; 338/32 R, 32 H; 341/15; 73/DIG. 2, DIG. 3

[56] References Cited

U.S. PATENT DOCUMENTS

| | | | |
|---|---|---|---|
| 3,185,920 | 5/1965 | Brunner | 324/207.2 X |
| 3,243,692 | 3/1966 | Heissmeier et al. | 324/207.2 X |
| 4,555,120 | 11/1985 | Frait et al. | 324/207.2 X |
| 4,829,834 | 5/1989 | Masom | 324/174 X |

FOREIGN PATENT DOCUMENTS

| | | | |
|---|---|---|---|
| 0110122 | 6/1984 | European Pat. Off. | 324/235 |
| 60-82918 | 5/1985 | Japan . | |
| 62-111662 | 7/1987 | Japan . | |
| 1293821 | 10/1972 | United Kingdom | 324/235 |

Primary Examiner—Gerard R. Strecker

[57] ABSTRACT

A magnetic sensor includes a sensor housing having a front end directed toward a member to be sensed. A magneto-electric transducer is mounted in the sensor housing and disposed adjacent to the front end of the sensor housing. A magnetic flux-collecting chip of a high-permeability material is supported on the front end of the sensor housing. The magnetic flux-collecting chip is disposed forwardly of the magneto-electric transducer. The magnetic flux-collecting chip has an exposed front face directed away from the magneto-electric transducer. The sensing ability or performance of the magneto-electric transducer is substantially determined by a magnetic gap between the front face of the magnetic flux-collecting chip and the member to be sensed.

4 Claims, 3 Drawing Sheets

MAGNETIC SENSOR, WITH SENSOR GAP ADJUSTING HIGH PERMEABLE FLUX COLLECTING CHIP, FOR DETECTING ROTATION

BACKGROUND OF THE INVENTION

This invention relates to a magnetic sensor for detecting rotation or the like.

Japanese Laid-Open (Kokai) Utility Model Application No. 111662/87 discloses a rotation detecting device having a magnetic sensor. This conventional rotation detecting device will now be briefly described with reference to FIG. 5. The rotation detecting device comprises a magnetic sensor 10', and a sensing plate 20' (member to be sensed) fixedly mounted on a rotatable shaft 25' for rotation therewith. The magnetic sensor 10' and the sensing plate 20' cooperate with each other to sense or detect the rotation of the rotatable shaft 25'.

In the above rotation detecting device, the outer peripheral surface of the sensing plate 20' is so magnetized as to have alternate north and south poles. The magnetic sensor 10' includes a cylindrical sensor housing 11' which is supported on a support member 30' disposed adjacent to the sensing plate 20'. The sensor housing 11' extends toward the sensing plate 20', and has a front end disposed in opposed relation to the outer peripheral surface of the sensing plate 20' A Hall element (magneto-electric transducer) 14' is fixedly secured to the front end of the sensor housing 11'.

In the magnetic sensor 10' of this type, a clearance d' (hereinafter referred to as "magnetic gap") between the outer peripheral surface of the sensing plate 20' and the front face of the Hall element 14' influences the sensing performance or ability of the magnetic sensor 10'. It has been difficult to adjust the magnetic gap d' highly precisely when mounting the magnetic sensor 10' on the support member 30'.

Japanese Laid-Open Utility Model Application No. 182414/87 and Japanese Laid-Open Patent Application No. 82918/85 also disclose magnetic sensors similar in construction to the above magnetic sensor 10'.

SUMMARY OF THE INVENTION

It is an object of this invention to provide a magnetic sensor of the type in which a magnetic gap between a member to be sensed and the magnetic sensor can be easily adjusted with high precision.

According to the present invention, there is provided a magnetic sensor comprising:

(a) a sensor housing having a front end adapted to be directed toward a member to be sensed;

(b) a magneto-electric transducer mounted in the sensor housing and disposed adjacent to the front end of the sensor housing; and (c) a magnetic flux-collecting chip of a high-permeability material supported on the front end of the sensor housing, the magnetic flux-collecting chip being disposed forwardly of the magneto-electric transducer, and the magnetic flux-collecting chip having an exposed front face directed away from the magneto-electric transducer.

DESCRIPTION OF THE PREFERRED EMBODIMENTS OF THE INVENTION

The invention will now be described with reference to the drawings.

Figure 1:
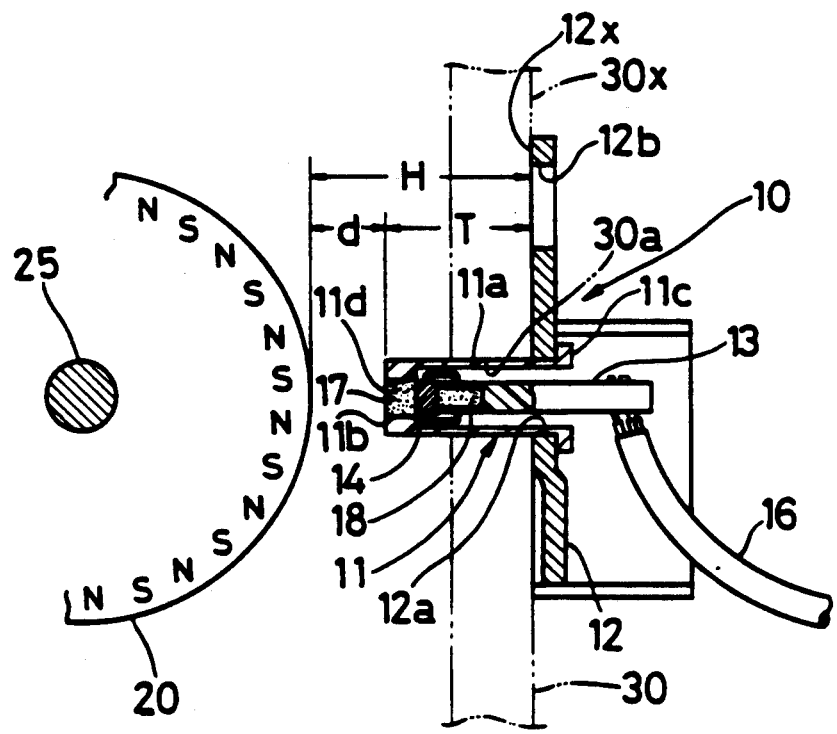
FIG. 1 is a partly cross-sectional, side-elevational view of a rotation detecting device incorporating a magnetic sensor according to the present invention.
Figure 2:
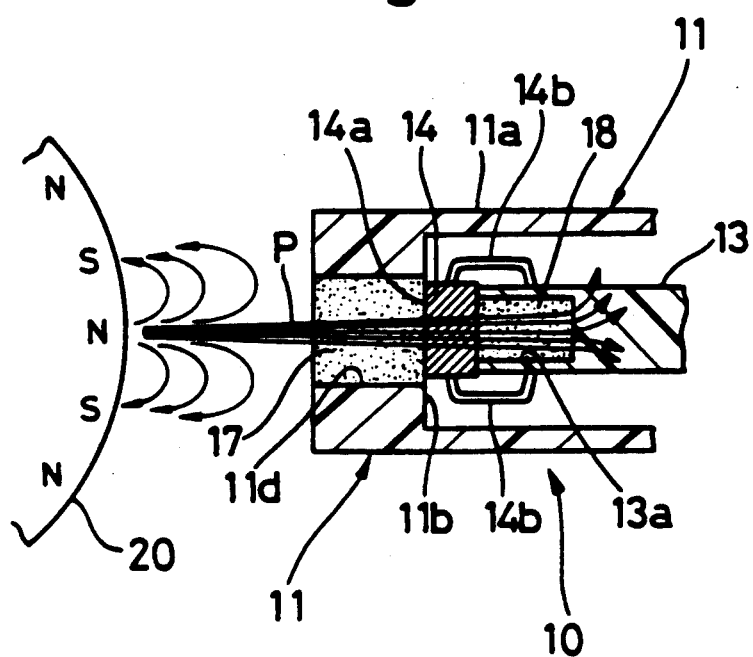
FIG. 2 is an enlarged, cross-sectional view of a front portion of the magnetic sensor.

FIGS. 1 and 2 show a rotation detecting device incorporated in a relevant apparatus. This rotation detecting device comprises a magnetic sensor 10 according to the present invention, a disc-shaped sensing plate (member to be sensed) 20 fixedly mounted on a rotatable shaft 25 for rotation therewith, and a support member 30 supporting the magnetic sensor 10.

The outer peripheral surface of the sensing plate 20 is so magnetized as to have alternate north and south poles circumferentially spaced from one another at equal intervals. The support member 30 is disposed adjacent to the sensing plate 20, and a rear face of the support member 30 facing away from the sensing plate 20 serves as a positioning surface 30x. The support member 30 has an insertion hole 30a which is formed therethrough and directed toward the sensing plate 20.

The magnetic sensor 10 comprises a sensor housing 11 made of a resin. The sensor housing 11 has a cylindrical tubular portion 11a, an end wall 11b formed on a front end of the tubular portion 11a, and a mounting flange 11c formed on a rear end of the tubular portion 11a and directed radially outwardly. A through hole 11d is formed through the central portion of the end wall 11b, and extends along the axis of the sensor housing 11. The through hole 11d may have either a circular shape or a polygonal shape.

The magnetic sensor 10 further comprises a positioning plate 12 having an insertion hole 12a formed therethrough. The rear end portion of the sensor housing 11 is fitted in the insertion hole 12a, and the mounting flange 11c is fixed to the rear face of the positioning plate 12. In this fixed condition, the sensor housing 11 is disposed perpendicular to the positioning plate 12.

The positioning plate 12 has another hole 12b formed therethrough. A fixing jig (not shown) is adapted to be inserted in the hole 12b, and is, for example, threaded into the support member 30, thereby fixing the magnetic sensor 10. In this fixed condition, the sensor housing 11 is received in the insertion hole 30a of the support member 30, and extends toward the outer peripheral surface of the sensing plate 20. Namely, the front end of the sensor housing 11 is disposed in opposed relation to the outer peripheral surface of the sensing plate 20.

A front face of the positioning plate 12 facing the sensing plate 20 serves as a positioning surface 12x. The positioning of the magnetic sensor 10 is effected by contacting or mating the positioning surface 12x with the positioning surface 30x of the support member 30.

The internal structure of the magnetic sensor 10 will now be described in detail. An elongate holder 13 in the form of a printed circuit board is received in the tubular portion 11a of the sensor housing 11. A Hall element (magneto-electric transducer) 14 is received in the front end portion of the tubular portion 11a of the sensor housing 11. More specifically, the Hall element 14 is interposed between the end wall 11b of the sensor housing 11 and the front end of the holder 13. A front face of the Hall element 14 facing the sensing plate 20 serves as a sensing surface 14a.

Lead wires 14b extending from the Hall element 14 are connected to printed conductors on the holder 13. A sensing signal from the Hall element 14 is fed to the exterior via the lead wires 14b, the printed conductors on the holder 13 and a cord 16 connected to the rear end of the holder 13.

A magnetic flux-collecting chip 17, substantially identical in cross-section to the through hole 11d through the front end wall 11b of the sensor housing 11, is press-fitted in the through hole 11d to close the through hole 11d in an air-tight manner. The magnetic flux-collecting chip 17 is made of a material of a high permeability, such as pure iron, and therefore is capable of collecting a magnetic flux. The front face of the magnetic flux-collecting chip 17 is exposed at the front end of the sensor housing 11, and faces the outer peripheral surface of the sensing plate 20.

The front face (i.e., sensing surface 14a) of the Hall element 14 is held in intimate contact with the rear face of the magnetic flux-collecting chip 17. The rear face of the Hall element 14 is held in intimate contact with a front face of a magnetic flux-collecting chip 18 made of the same material as the magnetic flux-collecting chip 17. The magnetic flux-collecting chip 18 is press-fitted in a recess 13a formed in the front end face of the holder 13.

In the condition in which the magnetic sensor 10 of the above construction is attached to the support member 30, the magnetic flux-collecting chip 17 is disposed forwardly of the Hall element 14 and is held in intimate contact with the sensing surface 14a of the Hall element 14. Therefore, by adjusting the magnetic gap d between the front face of the magnetic flux-collecting chip 17 and the outer peripheral surface of the sensing plate 20, the sensing ability or performance of the Hall element 10 can be adjusted.

For example, the adjustment of the magnetic gap d is carried out in the following. The magnetic sensor 10 is positioned relative to the support member 30, and in this condition the magnetic gap d is measured. Then, the front face of the magnetic flux-collecting chip 17 is cut or ground by an amount equal to a difference between the above measured value of the magnetic gap d and its optimum value. Thus, the magnetic gap d can be adjusted to the optimum value. At this time, since the front end face of the sensor housing 11 is cut together with the magnetic flux-collecting chip 17, the front face of the magnetic flux-collecting chip 17 is flush with the front end face of the sensor housing 11, as shown in the drawings.

As will be appreciated from the foregoing, a length T between the front end of the sensor housing 11 and the positioning surface 12x and hence between the front face of the magnetic flux-collecting chip 17 and the positioning surface 12x is greater when the magnetic sensor 10 per se is manufactured than when the above adjustment is finished.

In the case where a distance H between the outer peripheral surface of the sensing plate 20 and the positioning surface 30x of the support member 30 is beforehand adjusted highly precisely to a desired value, the magnetic gap d can be highly precisely adjusted to the optimum value by adjusting the length T between the front end of the sensor housing 11 and the positioning surface 12x at the time of manufacturing the magnetic sensor 10.

Since the Hall element 14 is sandwiched between the two magnetic flux-collecting chips 17 and 18, a magnetic flux P can be caused to concentrate on the Hall element 14.

Figure 3:
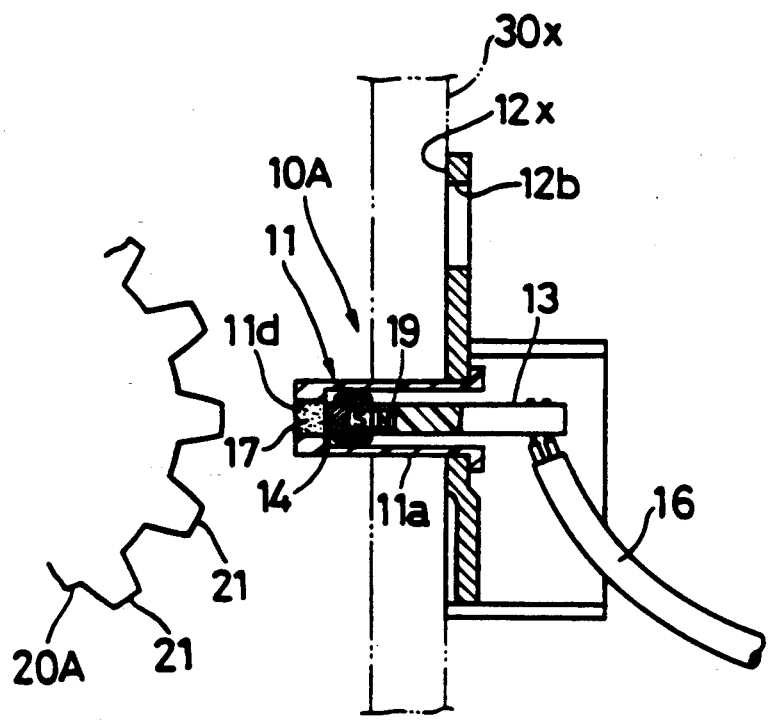
FIG. 3 is a view similar to FIG. 1, but showing a modified magnetic sensor.
Figure 4:
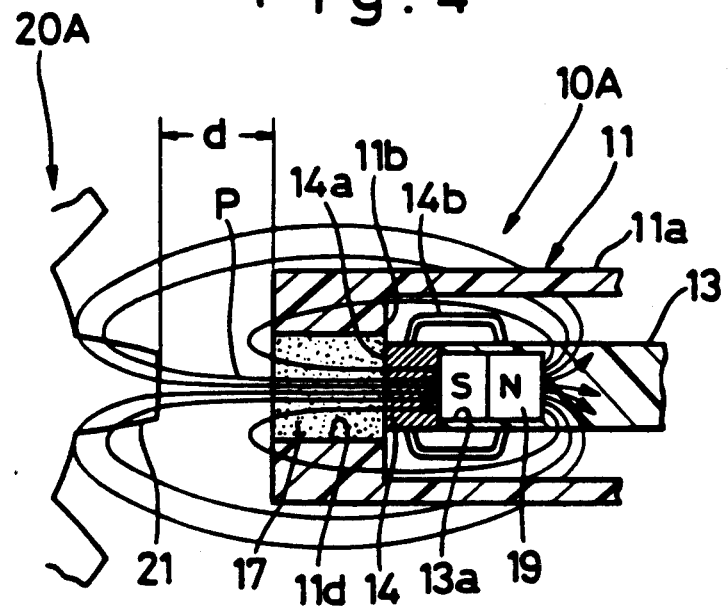
FIG. 4 is an enlarged, cross-sectional view of a front portion of the magnetic sensor of FIG. 3.
Figure 5:
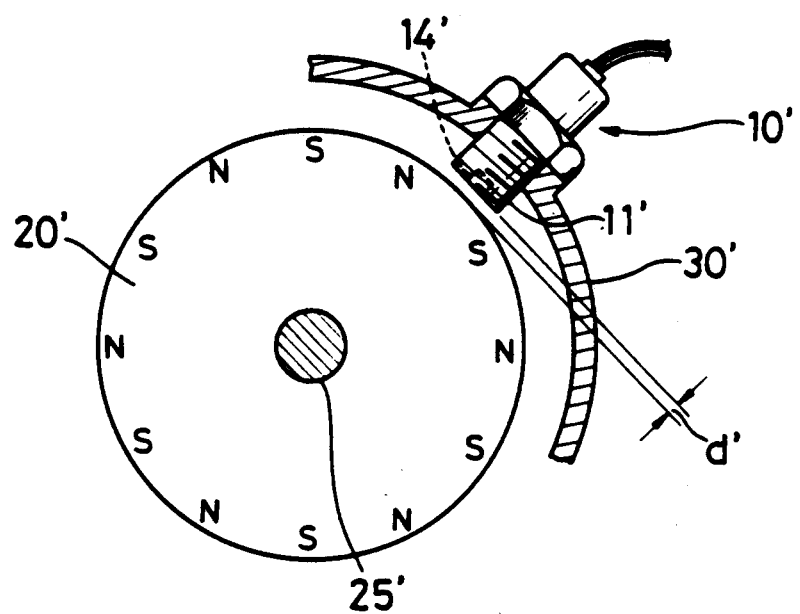
FIG. 5 is a view showing a rotation detecting device incorporating a conventional magnetic sensor.

FIGS. 3 and 4 shows a modified rotation detecting device. In this embodiment, a sensing plate 20A is made of a magnetic material, and is not magnetized. The sensing plate 20A is in the form of a gear. More specifically, teeth 21 are formed on the outer periphery of the sensing plate 20A, and are circumferentially spaced from one another at equal intervals. A magnetic sensor 10A in this embodiment is similar to the magnetic sensor 10 shown in FIGS. 1 and 2, but differs therefrom only in that a permanent magnet 19 replaces the magnetic flux-collecting chip 18. The permanent magnet 19 has north and south poles juxtaposed along the axis of the sensor housing 11. Since the other parts of this embodiment are the same as those of the preceding embodiment, they are denoted by the same reference numerals, respectively.

In the case of the magnetic sensor 10A, as each of the teeth 21 of the sensing plate 20A approaches the front end of the magnetic sensor 10A, the magnetic flux passing through the Hall element 14 is increased. In contrast, as the tooth 21 moves away from the front end of the magnetic sensor 10A, the magnetic flux passing through the Hall element 14 is decreased. The rotation of the sensing plate 20A is sensed by this variation of the magnetic flux.

In the magnetic sensor 10A, as in the magnetic sensor 10 of the preceding embodiment, the magnetic flux-collecting chip 17 is disposed forwardly of the Hall element 14, and by cutting the front face of the magnetic flux-collecting chip 17, the magnetic gap d can be adjusted.

In the above embodiments, although the Hall element is used as a magneto-electric transducer, other suitable magneto-electric transducers composed of a semi-conductor, such as a magneto-resistance element, can be used. Also, there may be used any other magneto-electric transducers which are not composed of a semi-conductor and can not be adjusted in size by cutting.

The magnetic flux-collecting chip may project beyond the front end face of the sensor housing.

The invention is not to be restricted to the above embodiments, and various modifications can be made.

What is claimed is:

1. A magnetic sensor for detecting rotation comprising:
    (a) a disk-shaped sensing plate which is rotatable with an object to be sensed;
    (b) a sensor having a tubular portion and an end wall formed on a front end of said tubular portion, said end wall being disposed in opposed relation to an outer periphery of said sensing plate, a hole being formed through said end wall and having an axis extending in the direction of an axis of said tubular portion;
    (c) a magneto-electric transducer mounted in said sensor housing and disposed adjacent to said end wall of said sensor housing, said electro-magnetic transducer comprising a semi-conductor element;
    (d) a magnetic flux-collecting chip of a high permeability material capable of being cut, said magnetic flux-collecting chip being received in and fixed to said hole of said end wall of said sensor housing and disposed forwardly of said electro-magnetic transducer, and said magnetic flux-collecting chip having an exposed front face which is directed away from said electro-electric transducer and faces said outer periphery of said sensing plate; and (e) positioning means for positioning said sensor housing;

wherein said front face of said magnetic flux-collecting chip is so cut that a magnetic gap between said outer periphery of said sensing plate and said front face of said magnetic flux-collecting chip is equal to a predetermined optimum value.

2. A magnetic sensor according to claim 1, in which said magnetic flux-collecting chip and said magneto-electric transducer are held in intimate contact with each other.

3. A magnetic sensor according to claim 2, in which said magnetic flux-collecting chip is made of pure iron, said magneto-electric transducer being composed of a Hall element.

4. A magnetic sensor according to claim 1, wherein said positioning means is mounted on an outer periphery of said sensor housing and spaced from said end wall of said sensor housing.

* * * * *

UNITED STATES PATENT AND TRADEMARK OFFICE
CERTIFICATE OF CORRECTION

PATENT NO. : 5,070,298
DATED : December 3, 1991
INVENTOR(S) : Naoko Honda, et. al.

It is certified that error appears in the above-indentified patent and that said Letters Patent is hereby corrected as shown below:

Column 4, line 54, replace "sensor" with --sensor housing--.

Column 4, line 63, replace "electro-magnetic" with --magneto-electric--.

Column 5, line 4, replace "electro-electric with --magneto-electric--.

Signed and Sealed this

Sixth Day of July, 1993

Attest:

MICHAEL K. KIRK

*Attesting Officer*  *Acting Commissioner of Patents and Trademarks*